United States Patent [19]

Dale et al.

[11] 4,205,151
[45] May 27, 1980

[54] POLYMERIC N-SUBSTITUTED MALEIMIDE ANTIOXIDANTS

[75] Inventors: James A. Dale, Menlo Park; Steve Y. W. Ng, San Francisco, both of Calif.

[73] Assignee: Dynapol, Palo Alto, Calif.

[21] Appl. No.: 821,163

[22] Filed: Aug. 2, 1977

Related U.S. Application Data

[62] Division of Ser. No. 642,038, Dec. 18, 1975, Pat. No. 4,078,091, which is a division of Ser. No. 565,168, Apr. 4, 1975, abandoned.

[51] Int. Cl.$^2$ ............... C08F 122/40; C08F 222/40; C08F 4/04
[52] U.S. Cl. ..................... 526/262; 260/45.9 NC; 526/218
[58] Field of Search ............ 260/47 UA, 326.5 S, 260/326.5 FM, 326.26, 45.9 NC; 526/262, 313, 218

[56] References Cited

U.S. PATENT DOCUMENTS

| | | | |
|---|---|---|---|
| 3,265,708 | 8/1966 | Stiteler | 260/326.5 FM |
| 3,790,597 | 2/1974 | Dexter et al. | 260/326.5 S |
| 3,953,402 | 4/1976 | Kline | 60/47 UA |

*Primary Examiner*—Herbert J. Lilling
*Attorney, Agent, or Firm*—William H. Benz

[57] ABSTRACT

N-substituted maleimide polymers comprising the recurring structural units:

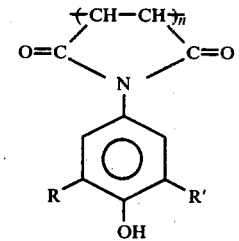

wherein R and R' independently are lower alkyl groups of from 1 to 5 carbon atoms and n is an integer of from about 2 to about 2,000, are disclosed. Their preparation as well as the preparation of their monomer precursors and the preferred use of the polymers as antioxidants, particularly nonabsorbable food antioxidants, are also disclosed.

9 Claims, No Drawings

POLYMERIC N-SUBSTITUTED MALEIMIDE ANTIOXIDANTS

This is a division of application Ser. No. 642,038, filed Dec. 18, 1975; now U.S. Pat. No. 4,078,091 which is a division of Ser. No. 565,168 filed Apr. 4, 1975, now abandoned.

BACKGROUND OF THE INVENTION

1. Field of the Invention

This invention relates to polymeric antioxidants. In particular, it relates to novel polymeric N-substituted maleimide antioxidants and their preparation.

2. Description of the Prior Art

N-substituted maleimide compounds have been known to be useful as antioxidants in many different compositions such as rubbers, resins and other materials subject to the deleterious effects of oxidative aging. A major class of materials requiring oxidative stabilization are foodstuffs where extremely stringent requirements have been established which must be met by antioxidant compounds to be used in food industries. One of the most important of these requirements is that the compound be non-toxic, in addition to providing adequate protection against oxidation.

Several phenolic compounds such as butylated hydroxytoluene (BHT) and butylated hydroxyanisole (BHA) have found wide use as antioxidants in foodstuffs. Recently major questions have been raised concerning the possible toxicity of these compounds, resulting in restriction of their use in the United States and actual prohibition in some European countries.

The development of safe alternatives is difficult for several reasons. Any of the known antioxidant compounds are of a nature such that upon ingestion and absorption from the gastointestinal tract into the body, many complex metabolic products are formed and since most antioxidants are capable of forming toxic derivatives and exact metabolic products are now known for most antioxidants, there almost always exists a substantial possibility of the development of a toxic compound. Additionally, even if it were possible to establish the non-toxicity of an antioxidant, the results would at best be only short term. It has recently become obvious in the food additive industry that only very long term testing can completely establish the activity of the many complex metabolic interactions which may occur upon ingestion and absorption of these compounds into the body.

It is possible however to overcome these problems when the antioxidant which is employed has a molecular size which prevents its being absorbed through the walls of the gastointestinal tract. This invention relates to such an antioxidant and to its preparation. The polymeric N-substituted maleimide antioxidants of the present invention may very easily be varied in molecular size so as to achieve the desired nonabsorption through the walls of the gastointestinal tract, thus eliminating any possibility of dangerous metabolic derivatives being formed upon absorption into the body. The antioxidants of the present invention also find use in non-food applications where their high molecular weight leads to low volatility and improved carry-through properties, as well as other advantages.

STATEMENT OF THE INVENTION

According to this invention, a new group of polymeric N-substituted maleimide materials has been developed, the molecular size of which can be tailored, so as to preclude appreciable absorption from the gastointestinal tract into the body. These materials exhibit substantial activity as antioxidants for fats, oils and other foodstuffs.

The N-substituted maleimide polymers of this invention are defined by the structural formula I.

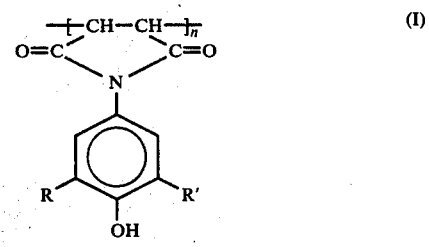

wherein R and R' independently are lower alkyl groups of from 1 to 5 carbon atoms, and n may be an integer of from about 2 to about 2,000.

These materials are homopolymers of N-(3,5-dilower alkyl-4-hydroxy phenyl)maleimides. Additionally, copolymers of these monomers with vinyl unsaturated comonomers may also be prepared. Preparation if by polymerization of the double bond in the maleimide ring, either cationically or free radically. In the case of free radical polymerization it has been surprisingly found that it is not necessary to block the aromatic hydroxyl groups during polymerization as would normally be expected. The free radial polymerization proceeds smoothly with unblocked monomer.

The monomers used to produce the polymers of the invention have the following structural formula:

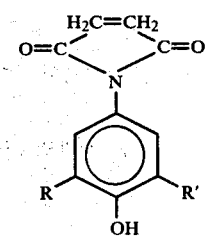

wherein R and R' independently are lower alkyl groups of from 1 to 5 carbon atoms. These monomer precursors also represent novel compounds.

DETAILED DESCRIPTION OF THE INVENTION

The polymeric antioxidants in accordance with this invention are poly(N-substituted maleimides) wherein the maleimide ring bears a substituted phenol moiety bonded to the nitrogen atom thereof in a position para to the phenolic hydroxyl group. The substituents borne by the phenol moiety are at the two ortho positions thereof, relative to the nuclear hydroxyl, and are designated R and R' in the aforenoted structural formula (I). These two substituents may independently be lower alkyl groups of preferably from 1 to 5 carbon atoms. Thus, each of R and R' can be any one of, for example, methyl, ethyl, isopropyl, tertiary butyl, n-pentyl, secand t-pentyl, and the like. While any of the foregoing substituents are suitable for the polymers of the present invention, the most preferred are when both R and R' are selected from tertiary butyl and tertiary pentyl.

The polymeric antioxidants of this invention are thus characterized as comprising recurrent structural units of the formula:

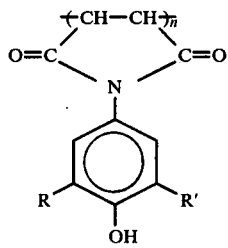

wherein n may be any number greater than 1 but will usually vary from about 2 or 3 to about 2,000. R and R' are as above defined. In addition to homopolymers comprised of the noted recurring structural units, co-monomers may be co- or interpolymerized with the subject maleimide monomers. The subject polymers are formed by polymerizing or copolymerizing monomeric N-substituted maleimides which also form a part of the present invention and which have the general structure:

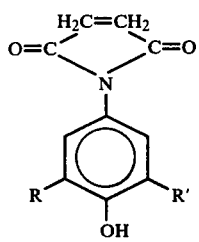

wherein R and R' are as set forth above.

These substituted maleimides are formed by maleic anhydride derivatization, which offers a convenient and inexpensive way to attach a polymerizable moiety, for example, a maleimide ring, onto another molecule such as a substituted phenol. It has been found that imides show significant stability in contrast to simply hydrolyzable esters or even to amides, a property which is of importance in antioxidants and especially in antioxidants to be included in foodstuffs in accordance with the present invention. The monomer precursors of the present invention, in addition to their own usefulness as antioxidant materials, have also been found to have utility as cross-linking agents in structural polymers.

The first step of one process for formation of these monomers involves the nitration of a 2,6-lower alkyl phenol using dilute nitric acid which is slowly added to a solution of the phenol over a preferred period of approximately 1 to 2 hours at a preferred temperature of from about 45° to 55° C. The reaction is carried out in an inert apolar organic solvent such as, hexane, petroleum ether, refinery fractions, mixtures thereof, and the like. This reaction is known in the literature (Newer Methods of Preparative Organic Chemistry, Vol. II, by Wilhelm Foerst 1963, Academic Press, pages 354 et seq.) and may be carried out at a temperature from about 25° C. to 150° C. for a time of from about 0.2 to 4 hours, with the above-mentioned conditions being preferred. At least one and preferably 1 to 4 molar equivalents of the dilute nitric acid should be used for each mole of the substituted phenol.

Purification of the 2,6-di-lower alkyl-4-nitrophenol may be accomplished by precipitation and sublimation and results in a yellow crystalline product.

Reduction of the 2,6-di-lower alkyl-4-nitrophenol is carried out to give the corresponding substituted amino phenol. This reduction is a facile one and can be carried out under varying conditions.

While reducing agents like sodium borohydride can be used to effect this reduction, it is generally preferred to employ catalytic hydrogenation wherein the nitrophenol, with or without prior purification is contacted as an organic solution with a metallic catalyst at an elevated pressure in the presence of hydrogen gas. The catalyst can be a soluble catalyst such as an organic cobalt salt but preferably is an insoluble particulate metallic material for example metal or metal oxides such as nickel, nickel oxides, chromium, cobalt. Raney nickel and copper, and the noble metals, platinum and palladium, either unsupported or on an inert support. Hydrogenation temperatures can range from room temperature to about 200° C., preferably from 50° C. to 150° C. A positive pressure of hydrogen such as from 50 psi to 2000 psi and preferably. 100 psi to 1500 psi is employed. Reaction time is inversely proportional to temperature and can range from about one minute to about 24 hours and preferably ranges from about ten minutes to about 20 hours. As solvent for the nitrophenol and aminophenol is employed polar organic liquids. These preferably are not subject to reduction at the conditions of hydrogenation and include hydrocarbons such as ethers, glyme, tetrahydrofuran (THF), diethyl ether and diisopropyl ether, aromatics such as toluene or benzene; either alone or in combination with apolar hydrocarbon diluents such as hexane or petroleum distillants. While the resulting amino phenol is initially colorless, it reacts rapidly with oxygen to give very deep, cherry red colored products. Thus, it is often desirable to employ an inert blanket over the product.

Alternatively the 2,6-di-lower-alkyl-4-aminophenol is prepared by the alkylation of a 4-aminophenol with an olefin under pressure by the action of an ortho alkylation catalyst such as is taught by Ecke et al in U.S. Pat. No. 2,831,898 of Apr. 23, 1958, with a 1,1-disubstituted olefin, as isobutylene, the reaction occurs almost entirely ortho to the hydroxyl groups and not to the amino substituent.

In the next stage of this process for formation of the monomer precursors of the present invention, the 2,6-di-loweralkyl-4-amino phenol obtained as above is reacted in liquid phase with an excess of maleic anhydride to give the maleamic acid which results from cleavage of the anhydride ring and formation of an amide linkage to the substituted phenol ring. This reaction is suitably carried out at room temperature or, if desired, at an elevated temperature. The maleamic acid is filtered and washed with solvent yielding brilliant yellow crystals. As an alternative method of separation, the acid can be precipitated completely by addition of carbon tetrachloride after which it is washed with water.

The substituted maleamic acid produced as above is cyclized such as by contact with acetic anhydride or a like dehydrating agent to provide the desired N-substituted maleimide monomer of the present invention. At least one mole of dehydrating agent is employed per mole of maleamic acid. The cyclization is preferably accomplished at a temperature of about 70° to 110° C. for approximately 30 minutes although similar conditions such as temperatures of from 40° C. to 150° C. and times of from 5 minutes to 2 hours would also give the monomers of the present invention. In addition to the acetic andydride, sodium acetate may also be present in the reaction mixture.

As mentioned above, the novel monomers resulting from the above described process are useful themselves as antioxidant materials and have also been found to have utility as crosslinking agents in various structural polymers. When used as antioxidant materials in various rubber and resin compositions, as well as in foodstuffs, the monomers of the present invention are normally added in amounts similar to prior art antioxidants, i.e., from about 0.001% to about 1% by weight of substrate. It is, however, the main purpose of this invention to produce polymeric antioxidant materials from these monomer precursors, which polymers are considered to be even more useful to stabilize various compositions, especially foods.

The polymerization of the monomers prepared above can be carried out by many of the methods of "olefin" type polymerization known in the art. However, cationic or free radical polymerizations are preferred with the most preferred being free radical initiated polymerization. Under conditions where the hydroxyl group of the monomers of the invention is not subject to significant reaction, polymerization may be carried out directly. Under certain conditions it is necessary to block the hydroxyl group prior to polymerization. The block may be, for example, an ester linkage which after polymerization may be easily removed by simple hydrolysis.

Cationic polymerization can generally be carried out without blockage of the hydroxyl group. As is typical in cationic polymerization of "olefin" type linkages, the monomer is dissolved in an inert solvent and is contacted with a catalytically effective amount of an acid catalyst such as, for example, sulfuric acid, boron trifluoride, stannic chloride and the like. Typically, the cationic polymerization is carried out at relatively low temperatures such as for example from 25° C. down to about −100° C., and the amount of catalyst can range from about 0.01% to about 10% by weight of the monomer. Depending upon the temperature and the amount of catalyst present the reaction can take from about 1 to about 75 hours with the shorter time being preferred. The polymers resulting from cationic initiated polymerization tend to be somewhat smaller in molecular size than products of free radical polymerization and as a result the cationic initiated method is well suited for preparing polymers as defined by the structural formula (I) above which have values of n from 2 to about 100.

Where polymerization of the monomers is achieved by free radical initiation the hydroxyl groups may be blocked to prevent possible branch polymerization, although it should be pointed out that the polymeric antioxidants made by radical polymerization of unblocked materials and likely for their intended uses with some degree of branched polymerization present are fully acceptable. Typically in a free radical polymerization the N-substituted maleimide monomer is dissolved in an inert solvent such as benzene and is contacted with a catalytically effective amount of a free radical initiator such as benzoyl peroxide, di-tertiarybutyl peroxide or azobisisobutyronitrile (AIBN) at a moderately elevated temperature such as from about 50° to about 125° C. for a period of from several hours to several days. The polymerization is preferably carried out at a temperature of from approximately 70° to 90° C. over a period of from several hours to one day. In many cases, an additional vinyl compound is present during the polymerization reaction in order to tailor the characteristics of the resulting polymers as desired, for example, to produce a more hydrophilic polymer. A substantial number of vinyl compounds can be utilized in such copolymerization techniques and representative are such olefinically unsaturated comonomers, copolymerizable with said maleimides, including ethyl vinyl ether, n-butyl vinyl ether, methyl vinyl ether, acrylonitrile, 1-butene, ethylene, vinyl benzene, the acrylic and methacrylic acids and the various esters thereof, e.g., the lower alkyl esters, as well as similar compounds with a polymerizable double bond. The degree of copolymerization in any of these cases is dependent on several different factors. The copolymers formed in accordance with reactions including these additional vinyl compounds can be represented by the structural formula II:

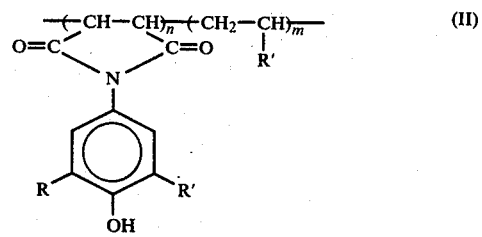

wherein R and R' are as previously defined, n can be an integer between two and several thousand, m can be any integer greater than 1, and $R_1$, together with its two adjacent carbon atoms can be any of the initially unsaturated comonomer compounds mentioned above.

The polymeric N-substituted maleimide antioxidants of the present invention, as mentioned above, contain n monomer units where n may range in value from about 2 to about 2,000. Preferred molecular weights fall within the range of from about 1,000 to 100,000. It can be seen that unless substantial fractionation is performed, materials having a range of molecular sizes will be produced. The polymeric antioxidants of this invention find application in industrial materials and can be used to prevent or retard oxidation in such products as synthetic rubber, fibers, lubricants, plastics, and the like, as well as various natural similar products. Among the natural substances, these antioxidants find preferred application as preservatives for foodstuffs, such as feeds for man and animals and especially preventing rancidity of fats and oils and deterioration of food values such as flavors, fragrances or vitamins. In food applications it is preferred to employ these polymeric materials in molecular sizes which substantially prevent their passage through the walls of the gastrointestinal tract, so as to avoid any possibility of toxicity from metabolic derivatives of these compounds. While the factors governing molecular passage through the gastrointestinal tract walls are varied and depend upon the exact chemical composition of the molecule in question, it has been generally found that passage of the polymeric antioxidants of the present invention is substantially prevented when n is greater than about 10. Under these conditions, less than 5% of the amount ingested is absorbed through the gastrointestinal tract walls. While the molecular sizes described previously will function in the manner of the present invention, a preferred range for n in food applications is between 20 and 1,500, with values from 40 to 1,250 being most preferred.

While the polymeric antioxidants of the invention are relatively hydrophobic in homopolymeric form, making their application in oils and fats very good, it is possible by copolymerizing hydrophilic materials into the polymer chain to effect emulsification or gelation of these antioxidants thus making them suitable for use in water or other polar media. Suitable monomers for this purpose include many of those mentioned above which contain copolymerizable vinyl groupings and also contain some polar hydrophilic group such as an ether or acrylic acid grouping. As previously discussed, other copolymerizable materials may also be added. These comonomeric moieties may be present in the polymeric antioxidants of the invention in amounts of between about 0.1 to about 2.0 parts by weight per part of maleimide monomer. As mentioned in the description of the polymerization process these copolymerizable materials may be added to the polymerization mixture when the polymer is being formed.

In use, the polymeric antioxidants of this invention are mixed with the substrate to be stabilized in an amount which is not critical as long as an effective or stabilizing amount is used. By a "stabilizing amount" is meant an amount upon which mixture is sufficient to stabilize the food or other substance against oxidative deterioration for the desired period of time. While this amount will of course vary with the particular antioxidant and the material to be stabilized, the amounts employed will generally range from about 0.0001% to about 10% of the total weight of the composition containing the antioxidant, with an amount of from 0.001% to 1% being generally preferred.

For most food applications such as pre-cooked, freshly cooked, frozen and similar foods as well as for solid and liquid foods, the amount of antioxidant added can be as little as 0.0001% or 1 part per million to about 0.2% by weight which is 2,000 parts per million. The polymeric N-substituted maleimide antioxidants of this invention can be used either alone or in combination with other antioxidants of either a polymeric or monomeric type in an effective amount for substantial protection of foods and other products similarly vulnerable to oxidative deterioration.

The preferred polymeric antioxidants of this invention as well as their monomeric precursors and the preparation of both will be further described by the following examples, which are intended to illustrate the invention only and are not to be construed as limiting the scope thereof.

EXAMPLE 1

Preparation of 2,6-di-tertiarybutyl-4-nitrophenol

The preparation of 2,6-di-t-butyl-4-nitrophenol was carried out as reported in the literature. [Newer Methods of Preparative Organic Chemistry, Vol. 2, by Wilhelm Foerst, 1963, Academic Press, page 354] 103 grams of 2,6-di-tertiary-butylphenol phenol were dissolved in 100 ml. of light petroleum, and after heating to 50° C., 95 ml. of dilute nitric acid were added dropwise with vigorous stirring over a period of 1 hour, during which time the temperature was held between 50° and 55° C. Along with the evolution of small amounts of nitrous gases, the reaction product 2,6-di-tertiary-butyl-4-nitrophenol precipitates as a light yellow crystalline mass which was filtered by suction, covered with cold petroleum ether, washed with water until neutral, and then dried. A similar preparation was performed where the purification of the nitrophenol was accomplished by precipitation and sublimation. In this preparation, the nitric acid was a 3N solution and the temperature was maintained between 45° and 55° C.

EXAMPLE 2

Preparation of 2,6-di-tertiary-butyl-4-aminophenol

The nitrophenol prepared as in Example 1 was hydrogenated in 100 ml. of analytical grade hexane solution which contained 20 ml. of tetrahydrofuran for a period of 96 hours. Four drops of HOAc were also added. Some difficulty was initially experienced in dissolving the nitrophenol in the hexane without recrystallization, however, this problem was eliminated by the addition of the tetrahydrofuran. The solution was checked each day for a pressure of 50 psi and after a period of 4 days the mixture was filtered through an 8 micron filter and evaporated under vacuum. The product reflected 50% conversion to the desired 2,6-di-tertiary-butyl-4-aminophenol, and showed approximately 50% remaining nitrophenol.

In other attempts at hydrogenation of the nitrophenol compound, higher pressure was utilized. 10 gm. of the nitrophenol were dissolved in 300 ml. of tetrahydrofuran. The hydrogen pressure was maintained at 1,000 psi and 1 gm. of nickel catalyst was added. The temperature was maintained at 85° C. for 20 hours. The conversion in this case was about 100% and a similar yield of about 100% was obtained in another attempt a hydrogenation where the temperature was maintained at 80° C. over a period of 15 hours; the initial pressure of 1,000 psi developed a leak which dropped the pressure to 200 psi by the end of the 15-hour reaction time.

EXAMPLE 2A

Alternatively, the amino phenol is prepared as follows: 110 g of p-amino phenol is added to 500 ml of tolnene and 6.4 g of distilled aluminum isopropoxide in a glass liner of a 1 liter Autoclave Engineers ™ stirred pressure reactor. The vessel is closed, evacuated for 2–4 minutes with a vacuum pump, then cooled with an isopropyl alcohol dry ice bath until some 183 g of isobutylene has been condensed. The vessel is stirred for 3 hours without heating and then with heating for 11 hours. The temperature is held at 100° C. using a Thermo Electric ™ 400 contoller with thermocouple. After cooling, the soltuion is reduced under vacuum to give the product as found in Example 2.

EXAMPLE 3

Preparation of N-(3,5-di-tertiary-butyl-4-hydroxyphenyl)-maleamic acid 5 gm. of maleic anhydride was dissolved in 100 ml. of diethyl ether and all of the 2,6-di-tertiary-butyl-4-aminophenol (3,5-di-tertiary-butyl-4-hydroxyaniline) of 2 was added in a 50 ml. diethyl ether solution at room temperature. Within 5 minutes a solid yellow material began to crystallize from the deep red solution. The mixture was stirred overnight and then chilled and filtered and the precipitate was washed with chilled ether three times. The precipitate was a bright yellow powder. The powder readily dissolved in a solution which contained dimethyl sulfoxide with CDCl₃. The NMR spectrum was as predicted for the desired maleamic acid. A small sample of 0.6 gm. was set aside and the remaining product was divided in half with one portion treated to form the maleimide and the other portion held in reserve.

The resulting N-(3,5-di-tertiary-butyl-4-hydroxyphenyl)maleamic acid was found to be soluble in dimethyl sulfoxide solution as well as in a mixture of tetrahydrofuran with methyl alcohol, and was found to be insoluble or only slightly soluble in aqueous and aqueous basic solutions, diethyl ether and was slightly to moderately soluble in carbon tetrachloride methyl dichloride solution.

EXAMPLE 4

Preparation of N-(3,5-di-tertiary-butyl-4-hydroxyphenyl)-maleimide 12 ml. of acetic anhydride and 2 gm. of anhydrous sodium acetate were heated to 110° C. and then 6 gm. of the N-(3,5-di-tertiary-butyl-4-hydroxyphenyl)-maleamic acid prepared as above was added. After 30 minutes the temperature had dropped to 70° C. and the mixture solidified but was still pourable into 100 ml. water plus 100 ml. ice solution. The solid was filtered from the water and dissolved in chloroform after which it was dried with sodium sulfate-magnesium sulfate, filtered and evaporated. The NMR spectrum was as predicted. Sublimation was attempted at 130° C. and 0.1 mm. pressure after nothing had happened at an 106° C/0.1 mm. pressure sublimation over a 30-minute period. The sublimate showed little difference from the unsublimed starting material. A crystallization from 20 ml. of benzene also had little effect on the mixture. An NMR spectrum indicated that a small amount of an acetanilide by-product was possibly present. The material was column chromatographed on 75 gm. of neutral silicic gel with chloroform solution. The results were as set out in the following table:

| Solvent | Fraction | ml. of Solvent | Residue |
|---------|----------|----------------|---------|
| CHCl₃   | 1        | 200 ml.        | —       |
| CHCl₃   | 2        | 400 ml.        | malemide (yellow) |
| CHCl₃   | 3        | 300 ml.        | —       |
| THF     | 4        | 200 ml.        | acetanilide (colorless) |

Fraction No. 2 was evaporated and re-vacuum sublimed giving the desired maleimide of an acceptable purity. The acetanilide was found to be approximately 30% of the initial product.

EXAMPLE 4A 12 gm. of N-(3,5-di-t-butyl-4-hydroxyphenyl)-maleamic acid was added to a mixture of 4 gm. sodium acetate acid 24 ml. acetic anhydride held at 110° C. After 70 min., the mixture was poured into 200 ml. water plus 200 ml. ice. After the ice had melted, the precipitate was filtered from the solvent. The solid was dissolved in chloroform; this solution was worked with water, dried with anhydrous sodium sulfate, filtered and evaporated to a residue which sublimed at 140° C./0.1 mm to give 9.5 gm. (84%) of the desired monomer.

EXAMPLE 5

Preparation of Poly-N-(3,5-di-tertiary-butyl-4-hydroxyphenyl)-maleimide

The polymerization of the N-substituted maleimide monomer will be described.

9 gm. sublimed but un-chromatographed monomer (prepared in Example 4A) was dissolved in 50 ml. of benzene and heated to reflux. 0.04 gm. and approximately 0.020 gm. of azo-bis-isobutylronitrile (AIBN) were added at first and after 2 hours of a 4 hour reflux period a polymer formed and was precipitated from hexane. The product showed a molecular weight (by gel permeation chromatography) of 16,000 compared to a known polystyrene reference. NMR and IR analysis indicated that the polymer had the structure:

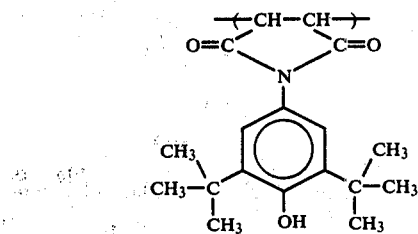

EXAMPLE 6

Preparation of Maleimide ethyl vinyl ether copolymer 0.1598 gm. of redistilled ethyl vinyl ether were added to a 10 ml. benzene solution containing 0.6223 gm. of N-(3,5-di-tertiary-butyl-4-hydroxyphenyl) maleimide and 0.010 gm. of recrystallized azo-bis-isobutyronitrile (AIBN) was also added. The solution was kept at 30° C. for 19 hours during which time a yellow color persisted in the solution. More ethyl vinyl ether (0.1929 gm) was added and the solution heated to 85° C. initiating a slight, slow reflux which was continued for one-half hour after which the temperature was adjusted to 72° C. for a 24-hour period. The yellow solution gave a precipitate upon introduction into 200 ml. of hexane but maintained a homogeneous solution upon introduction into methanol solution. The hexane precipitate was filtered and by NMR, and GPC indicated to be a mixture of polymer of a peak molecular weight of approximately 50,000. Most of the polymer was homopolymer of the structure shown in Example 5. Though not isolated, there was evidence of ethyl vinyl ether copolymer as well, such material having a structure:

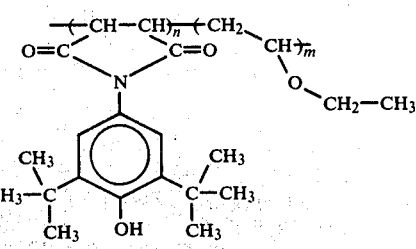

EXAMPLE 7

Preparation of Maleimide n-butyl vinyl ether copolymer 1.62276 gm. of the maleimide monomer prepared as in Example 4 which had been precipitated from pentane was dissolved along with 1.9044 gm. of n-butyl vinyl ether and 6 ml. of tetrahydrofuran in a glass tube. A small crystal of AIBN was added, the weight of which was about 0.005 to 0.009 gm. The tube was placed in an oil bath at 79° to 80° C. for one hour, after which the yellow color had faded considerably. Another small crystal of AIBN was added at room temperature and the homogeneous solution returned to the heating bath for 2 hours more at the same temperature. The volume of THF was reduced to about 1.5 ml. and this was slowly dropped into 100 ml. of pentane. The precipitate was collected and the NMR spectrum showed an alkane chain and some diffuse ether indications. Indications were that some butylvinyl ether had been incorporated into the polymer chain and the degree of copolymerization was comparable with the results described above. The molecular weight in this product was found to be approximately 28,000.

EXAMPLE 8

Stability of Polymaleimide Antioxidant

The stability of polymaleimide antioxidant of Example 5 in acidic and basic THF-water at 51.5° C. was investigated. No changes occurred in acidic medium. Basic incubation led to minor changes in molecular weight distribution. Pendant group cleavage did not occur above ca. 1% in either medium.

Hydrolytic cleavage of the amide linkages in the polymaleimide antioxidant would be expected to yield a p-aminophenol and poly(maleic acid). It was desirable to determine the stability of this group to acid/base catalyzed hydrolysis.

Samples of polymaleimide were incubated in THF:H$_2$O 9:1 v/v containing either 1×10$^{-1}$M HCl or 1×10$^{-4}$M NaOH at 51.5° C. for 48 hours. These conditions were chosen to maximize water content without phase separation. Untreated polymer solutions, and incubation mixtures without polymer provided experimental controls. Molecular weight distributions were analyzed by high efficiency GPC using refractive index (RI) and UV detection.

GPC chromatograms of acid and base incubates and appropriate controls were taken. Acid incubation did not lead to any change in molecular weight distribution; base incubation resulted in a small decrease in peak molecular weight and a slight broadening of the distribution. There was, however, no compelling evidence of an aminophenol cleavage product in the chromatograms of either acid- or base-treated polymer solutions.

It will thus be appreciated that a polymaleimide antioxidant is stable with respect to acid-catalyzed hydrolytic cleavage. In the presence of base, subtle alterations in the molecular weight distribution suggest the possibility of slight polymer backbone cleavage. Pendant group cleavage was within the limits of detection, i.e., less than ca. 1%.

While there have been described and pointed out the fundamental novel features of the invention as applied to the preferred embodiments, those skilled in the art will appreciate that various modifications, changes, and omissions in the polymaleimide antioxidants illustrated and described can be made without departing from the spirit of the invention. It is the intention, therefore, to be limited only by the scope of the following claims.

We claim:

1. A polymeric maleimide comprising n

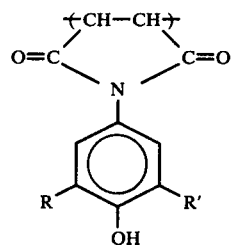

units, wherein R and R' independently are lower saturated alkyls of from 1 to 5 carbon atoms and n is an integer from 20 to about 1500.

2. The polymeric maleimide of claim 1, wherein said polymeric maleimide consists essentially of a homopolymer of repeating

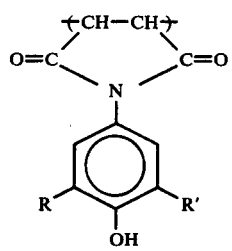

3. The polymeric maleimide of claim 1, wherein R and R' are each t-butyl groups.

4. The polymeric maleimide of claim 2, wherein R and R' are each t-butyl groups.

5. The polymeric maleimide of claim 1, having a molecular size which is too large to permit substantial passage of said polymeric maleimide through the walls of the gastrointestinal tract.

6. The polymeric maleimide of claim 5, having a molecular weight of from 1,000 to 100,000 as determined by gel permeation chromatography compared to polystyrene references.

7. The polymeric maleimide of claim 1, additionally comprising from 0.1 to 2.0 parts by weight per part of maleimide of copolymeric component selected from the group of

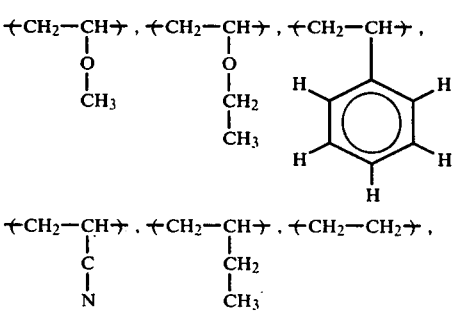

-continued

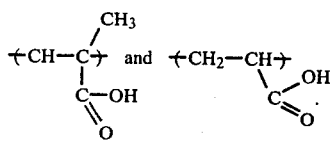

8. The process for preparing the polymeric maleimide of claim 1, which comprises contacting an N-substituted maleimide of the formula:

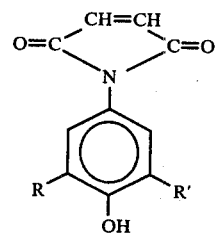

wherein R and R' independently are lower saturated alkyl groups of from 1 to 5 carbon atoms with a catalytically effective amount of a material selected from the group consisting of cationic and free radical polymerization initiators.

9. The process of claim 8, wherein R and R' are tert-butyl groups.

* * * * *